(12) United States Patent
Voillequin et al.

(10) Patent No.: US 10,230,094 B2
(45) Date of Patent: *Mar. 12, 2019

(54) CATHODE FOR A CELL OF A LITHIUM-ION BATTERY, ITS MANUFACTURING PROCESS AND THE BATTERY INCORPORATING IT

(71) Applicant: Hutchinson, Paris (FR)

(72) Inventors: Baptiste Voillequin, Bois-le-Roi (FR); David Ayme-Perrot, Huningue (FR); Bruno Dufour, Champagne sur Seine (FR); Philippe Sonntag, Avon (FR)

(73) Assignee: Hutchinson, Paris (FR)

( * ) Notice: Subject to any disclaimer, the term of this patent is extended or adjusted under 35 U.S.C. 154(b) by 203 days.

This patent is subject to a terminal disclaimer.

(21) Appl. No.: 15/288,325

(22) Filed: Oct. 7, 2016

(65) Prior Publication Data

US 2017/0025673 A1 Jan. 26, 2017

Related U.S. Application Data

(62) Division of application No. 13/742,626, filed on Jan. 16, 2013, now Pat. No. 9,484,571.

(30) Foreign Application Priority Data

Jan. 17, 2012 (FR) .................................... 12 50457

(51) Int. Cl.
| | | |
|---|---|---|
| *H01M 4/04* | (2006.01) | |
| *H01M 4/08* | (2006.01) | |
| *H01M 4/62* | (2006.01) | |
| *H01M 4/136* | (2010.01) | |
| *H01M 4/1397* | (2010.01) | |
| *H01M 10/0525* | (2010.01) | |
| *H01M 4/36* | (2006.01) | |
| *H01M 4/58* | (2010.01) | |
| *H01M 4/583* | (2010.01) | |
| *H01M 4/66* | (2006.01) | |
| *H01M 4/02* | (2006.01) | |

(52) U.S. Cl.
CPC ......... *H01M 4/0483* (2013.01); *H01M 4/043* (2013.01); *H01M 4/0404* (2013.01); *H01M 4/0409* (2013.01); *H01M 4/0411* (2013.01); *H01M 4/08* (2013.01); *H01M 4/136* (2013.01); *H01M 4/1397* (2013.01); *H01M 4/366* (2013.01); *H01M 4/583* (2013.01); *H01M 4/5825* (2013.01); *H01M 4/621* (2013.01); *H01M 4/622* (2013.01); *H01M 4/625* (2013.01); *H01M 4/661* (2013.01); *H01M 10/0525* (2013.01); *H01M 2004/028* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 5,749,927 A | 5/1998 | Chern et al. | |
| 6,541,640 B2 | 4/2003 | Pazenok et al. | |
| 6,939,383 B2 | 9/2005 | Eastin et al. | |
| 9,112,200 B2 | 8/2015 | Voillequin et al. | |
| 9,484,571 B2 * | 11/2016 | Voillequin ............ | H01M 4/136 |
| 2004/0121232 A1 | 6/2004 | Kato et al. | |
| 2009/0305132 A1 | 12/2009 | Gauthier et al. | |
| 2013/0040198 A1 | 2/2013 | Patoux et al. | |

FOREIGN PATENT DOCUMENTS

WO WO-2011/092283 8/2011

OTHER PUBLICATIONS

Extended European Search Report for European Patent Application No. 13151469.7 dated Mar. 12, 2013.
Search Report for French Application No. 1250457; dated Apr. 20, 2012.
Notice of Allowance for corresponding U.S. Appl. No. 13/742,626 dated Oct. 6, 2016.
Office Action for corresponding U.S. Appl. No. 13/742,626 dated Sep. 30, 2015.
Office Action for corresponding U.S. Appl. No. 13/742,626 dated Apr. 18, 2016.

\* cited by examiner

*Primary Examiner* — Jonathan Crepeau
(74) *Attorney, Agent, or Firm* — Alston & Bird LLP

(57) ABSTRACT

The invention relates to a cathode that is usable in a cell of a lithium-ion battery comprising an electrolyte based on a lithium salt and on a non-aqueous solvent, to a process for manufacturing this cathode and to a lithium-ion battery having one or more cells incorporating this cathode. This cathode is based on a polymer composition, obtained by melt processing and without solvent evaporation, that is the product of a hot compounding reaction between an active material and additives including a polymer binder and an electrically conductive filler. According to the invention, the binder is based on at least one crosslinked elastomer and the additives furthermore comprise at least one non-volatile organic compound usable in the electrolyte solvent, the composition advantageously includes the active material in a mass fraction greater than or equal to 90%.

20 Claims, No Drawings

CATHODE FOR A CELL OF A LITHIUM-ION BATTERY, ITS MANUFACTURING PROCESS AND THE BATTERY INCORPORATING IT

CROSS REFERENCE TO RELATED APPLICATIONS

This application is a divisional of U.S. application Ser. No. 13/742,626 filed Jan. 16, 2013, which claims priority to French Application No. 12 50457, filed Jan. 17, 2012, the entire contents of which are incorporated herein by reference.

FIELD

The present invention relates to a cathode that is usable in a cell of a lithium-ion battery, to a process for manufacturing this cathode, and to a lithium-ion battery having one or more cells incorporating this cathode.

BACKGROUND

There are two main types of lithium storage battery: lithium-metal batteries, where the negative electrode is made of lithium metal (which material causes problems with safety when in the presence of a liquid electrolyte), and lithium-ion batteries, where the lithium remains in the ionic state.

Lithium-ion batteries consist of at least two conductive Coulombic electrodes of different polarities, the negative electrode or anode (generally made of graphite) and the positive electrode or cathode (generally made of an oxide of a transition metal, such as an oxide of vanadium or cobalt, or made of a lithiated iron phosphate such as, for example, described in documents U.S. Pat. No. 6,514,640 or WO-A1-2011/092283), between which electrodes a separator is located, which separator consists of an electrical insulator imbibed with an aprotic electrolyte based on Li$^+$ cations ensuring the ionic conductivity. The electrolytes used in these lithium-ion batteries usually consist of a lithium salt, for example of formula $LiPF_6$, $LiAsF_6$, $LiCF_3SO_3$ or $LiClO_4$, which is dissolved in a mixture of non-aqueous solvents such as acetonitrile, tetrahydrofuran, or more often a carbonate, for example of ethylene or propylene.

The active material of the cathode of a lithium-ion battery allows reversible insertion/removal of lithium into/from this cathode, and the higher the mass fraction of this active material in the cathode, the higher its capacity. The cathode must also contain an electrically conductive compound, such as carbon black and, in order to provide it with sufficient mechanical cohesion, a polymer binder. A lithium-ion battery is thus based on the reversible exchange of lithium ions between the anode and the cathode during the charging and discharging of the battery, and, for a very low weight, by virtue of the physical properties of lithium, such a battery has a high energy density.

The cathodes of lithium-ion batteries are most often manufactured using a process comprising, in succession, a step of dissolving or dispersing the various ingredients of the cathode in a solvent, a step of spreading the obtained solution or dispersion on a metallic current collector, and then lastly a step of evaporating this solvent. Many types of polymer binders can be used, among which mention may firstly be made of PVDF (polyvinylidene fluoride), which is more easily compatible with a cathode operating at a high operating voltage (more than 4 V) because of the presence of fluorine, but also, for example, polyacrylonitriles (PAN) with polybutylacrylate latexes.

Processes for manufacturing the cathodes of lithium-ion batteries that use an organic solvent have many drawbacks with respect to the environment and safety. In particular, it is, in this case, necessary to evaporate large amounts of such solvents, which are toxic or inflammable.

As for processes that use an aqueous solvent to manufacture these cathodes, their major drawback is that the cathode must be very thoroughly dried before they can be used, traces of water being known to limit the useful lifetime of lithium storage batteries.

It is therefore highly desirable, for lithium-ion batteries, to prepare cathodes that are manufactured without using solvents. It is in this context that processes for manufacturing cathodes for lithium-ion batteries using melt processing techniques (for example extrusion) have been described in the literature.

Unfortunately, these melt processes cause major difficulties in the case of lithium-ion batteries, which, as is known, require a mass fraction of active material in the polymer mixture of the cathode of at least 90% for the latter to have sufficient capacity in the lithium-ion battery. However, at such contents of active material the viscosity of the cathode polymer mixture becomes very high, and leads to a risk of the mixture over-heating or losing its mechanical cohesion once it is in use.

Document U.S. Pat. No. 6,939,383 describes the extrusion of a polymer composition comprising a poly(ethylene oxide)-poly(propylene oxide)-poly(glycidyl ether) copolymer for a ionically conducting polymer for solventless implementation of a cathode for a lithium-polymer battery. However, the mass fraction of active material in the single cathode polymer composition manufactured in this document is only 64.5%.

Document U.S. Pat. No. 5,749,927 discloses a process for the continuous preparation of lithium-polymer batteries by extrusion, which process comprises compounding the active material with an electrical conductor and a solid electrolyte composition comprising a polymer, a lithium salt and a propylene carbonate/ethylene carbonate mixture greatly in excess over this polymer. In this document, the mass fraction of active material present in the cathode polymer composition is also below 70%.

Thus, a major drawback of these known melt processes for manufacturing cathodes for lithium storage batteries is that the mass fractions of active material in the cathode polymer composition are insufficient to obtain high-performance cathodes specifically for lithium-ion batteries.

SUMMARY

One aim of the present invention is therefore to provide a process, for manufacturing a cathode, that overcomes all of the aforementioned drawbacks, and this aim is achieved since the Applicant has discovered, surprisingly, that if an active material and additives comprising a crosslinked elastomer matrix, an electrically conductive filler and a non-volatile (i.e. having a boiling point above 150° C. at an atmospheric pressure of $1.013 \times 10^5$ Pa) organic compound, are hot compounded, without solvent evaporation, then a cathode polymer composition is obtained that is usable in a lithium-ion battery comprising an electrolyte based on a lithium salt and on a non-aqueous solvent, with a fraction of this active material in the composition clearly higher than those obtained previously by melt processing, and advantageously greater than or equal to 90%, the one or more organic compounds advantageously being used as a solvent for the electrolyte.

DETAILED DESCRIPTION

A cathode according to the invention, usable in a cell of a lithium-ion battery comprising an electrolyte based on a lithium salt and on a non-aqueous solvent, is thus based on a polymer composition, obtained by melt processing and without solvent evaporation, that is the product of a hot compounding reaction between an active material and additives comprising a polymer binder and an electrically conductive filler, and the cathode is such that the binder is based on at least one crosslinked elastomer and such that these additives furthermore comprise at least one non-volatile organic compound usable in this electrolyte solvent, the composition comprising the active material in a mass fraction advantageously greater than or equal to 90%.

It will be noted that this very high mass fraction of active material in the cathode according to the invention ensures that the or each cell obtained is a high-performance cell and therefore that the lithium-ion battery incorporating them is a high-performance battery.

It will also be noted that the uniform distribution of said at least one crosslinked elastomer in the composition ensures the mechanical strength of the cathode.

Advantageously, said active material may comprise at least one lithiated polyanionic compound or complex having an operating voltage below 4 V and preferably carbon coated, such as a lithiated metal M phosphate of formula $LiMPO_4$ (also called phosph-olivine), such as a carbon-coated lithium-iron phosphate having the formula $C—LiFePO_4$.

Specifically, it will be noted that the active material used in the composition of the present invention may consist of elementary carbon-coated particles or agglomerates of elementary particles comprising a carbon coating or deposit.

Preferably, said at least one elastomer is a peroxide-crosslinked diene elastomer and, even more preferably, a hydrogenated nitrile rubber (HNBR). Also preferably, said at least one elastomer may be present in said composition in a mass fraction between 1% and 5%.

Advantageously, said at least one non-volatile organic compound may comprise a carbonate, preferably a carbonate of at least one olefin such as ethylene, which is preferably used in the electrolyte composition.

It will be noted that using such a carbonate, such as an ethylene carbonate, advantageously allows:
the filler content in the composition to be increased;
the inherent risks with respect to the toxicity of volatile organic compounds (VOC), used in conventional processes for manufacturing cathodes, to be avoided because this carbonate is a product that is solid at room temperature and much less hazardous to handle; and
the cathode polymer composition to be used without evaporating the carbonate beforehand, and the incorporation of the electrolyte into the cathode to be made easier because this carbonate is one of the main constituents of electrolytes used at the present time in lithium-ion batteries.

Also advantageously, said at least one organic compound may be present in said composition in a mass fraction between 0.1% and 5%.

It will be noted that the invention allows the salts required for operation of the cathode to be incorporated during its manufacture.

According to another feature of the invention, said additives may furthermore comprise a crosslinking system that is present in the composition in a mass fraction between 0.05% and 0.20%, and that preferably comprises an organic peroxide and a crosslinking co-agent in the case where said at least one elastomer is a diene elastomer such as a hydrogenated nitrile rubber (HNBR).

According to another feature of the invention, said electrically conductive filler may be chosen from the group consisting of carbon black, graphite, expanded graphite, carbon fibres, carbon nanotubes, graphene and their mixtures, and is present in the composition in a mass fraction between 1% and 5%.

A process, according to the invention, for manufacturing a cathode such as defined above, is characterized in that it comprises:

a) melt compounding, without solvent evaporation, in an internal mixer or an extruder, of said active material and said additives comprising said binder and said organic compound in the solid state in order to obtain said composition in the crosslinkable state, this active material preferably comprising at least one lithiated polyanionic compound or complex such as a carbon-coated lithiated iron phosphate of formula $C—LiFePO_4$; and b) crosslinking and optionally hot forming this composition, in order to obtain said crosslinked composition.

According to another feature of the invention, step a) may be carried out by compounding said binder into a powder premix of the other ingredients of the composition, for example at a temperature between 60° C. and 80° C. in an internal mixer.

According to another feature of the invention, step b) may be carried out by hot pressing the crosslinkable composition.

Advantageously, the process of the invention may then comprise a step c) of rolling said crosslinked composition so as to deposit it on a metallic current collector with which said cathode is equipped.

A lithium-ion battery according to the invention comprises at least one cell comprising an anode, for example a graphite-based anode, a cathode such as defined above, and an electrolyte based on a lithium salt and on a non-aqueous solvent.

According to another advantageous feature of the invention said electrolyte solvent may comprise said at least one non-volatile organic compound of the cathode.

According to another aspect of the invention, said cathode comprises a metallic current collector making contact with at least one film made of said polymer composition.

Other features, advantages and details of the present invention will become clear from reading the following non-limiting description of an exemplary embodiment of the invention, given by way of illustration.

EXAMPLE 1

A cathode polymer composition was prepared in an Haacke internal mixer at 70° C., the composition comprising the following constituents expressed in mass fraction (%):

| | |
|---|---|
| HNBR binder ("Therban 4307") | 2.68 |
| Carbon black | 2.68 |
| Ethylene carbonate | 0.54 |
| Active material $C—LiFePO_4$ | 93.97 |
| Crosslinking system: | |

| | |
|---|---|
| Dicumyl peroxide | 0.08 |
| Triallyl cyanurate (TAC) | 0.05 |

The various compounds were introduced into this internal mixer in succession, starting with the hydrogenated nitrile rubber by way of a crosslinkable diene elastomer (HNBR binder), and then a premix in powder form of the other ingredients above. After this compounding, and hot pressing at 170° C. for 10 minutes simultaneously allowing the binder to be crosslinked, a 1 mm-thick electrode able to form a cathode inside a cell of a lithium-ion battery, after deposition on a current collector with which this cathode is equipped, was obtained directly.

It will be noted that the very high mass fraction (higher than 93%) of active material in this cathode ensures that the or each cell obtained is a high-performance cell and therefore that the lithium-ion battery incorporating them is a high-performance battery.

"Control" Example, not According to the Invention

A "control" composition having the same formulation (i.e. the same amounts of the same ingredients) as that of Example 1 was prepared by dispersing/dissolving said ingredients in a MIBK (methyl isobutyl ketone) solvent—i.e. using a process that did not conform to the melt process of the invention—this "control" composition being deposited by coating on a current collector.

It has be observed that the "control" cathode obtained by dispersing/dissolving had intrinsic physical properties that were very different to those of the cathode of Example 1, especially in terms of morphology (scanning electron microscope "SEM" micrographs), bulk density and electrical conductivity, as may be seen in Table 1 below.

In particular, it may be noted that the bulk density of the cathode obtained by melt processing (Example 1, without solvent) is clearly higher than 1—lying between 1.5 and 2—i.e. more than two times higher than the bulk density of the "control" cathode obtained with solvent.

TABLE 1

| | Cathode of Example 1 | "Control" cathode |
|---|---|---|
| Bulk density | 1.854 | 0.777 |
| Electrical conductivity (S/cm) | 0.0392 | 0.0065 |

The invention claimed is:

1. A Process for manufacturing a cathode based on a crosslinked composition, wherein the method comprises:
   a) melt compounding, without solvent evaporation, in an internal mixer or an extruder, an active material and additives comprising a polymer binder and an electrically conductive filler, wherein said binder is based on at least one crosslinkable elastomer and in that said additives furthermore comprise at least one non-volatile organic compound, wherein said non-volatile organic compound is in a solid state, in order to obtain a composition in a crosslinkable state; and
   b) crosslinking and optionally hot forming this crosslinkable composition, in order to obtain said crosslinked composition.

2. The process according to claim 1, wherein step a) is carried out by compounding said binder into a powder premix of the other ingredients of the crosslinkable composition at a temperature between 60° C. and 80° C. in an internal mixer.

3. The process according to claim 1, wherein step b) is carried out by hot pressing said crosslinkable composition.

4. The process according to claim 1, wherein said process then comprises a step c) of rolling said crosslinked composition so as to deposit it on a metallic current collector with which said cathode is equipped.

5. The process according to claim 1, wherein said active material comprises at least one lithiated polyanionic compound or complex.

6. The process according to claim 5, wherein said at least one lithiated polyanionic compound or complex comprises carbon-coated lithiated iron phosphate of formula $C-LiFePO_4$.

7. The process according to claim 1, wherein said active material comprises at least one lithiated polyanionic compound or complex having an operating voltage below 4 V.

8. The process according to claim 1, wherein said at least one elastomer is a peroxide-crosslinked diene elastomer.

9. The process according to claim 1, wherein said at least one elastomer is present in said composition in a mass fraction between 1% and 5%.

10. The process according to claim 1, wherein said at least one organic compound comprises a carbonate.

11. The process according to claim 1, wherein said at least one organic compound is present in said composition in a mass fraction between 0.1% and 5%.

12. The process according to claim 1, wherein said additives furthermore comprise a crosslinking system that is present in said composition in a mass fraction between 0.05% and 0.20%, and that comprises an organic peroxide and a crosslinking co-agent in the case where said at least one elastomer is a diene elastomer.

13. The process according to claim 1, wherein said electrically conductive filler is chosen from the group consisting of carbon black, graphite, expanded graphite, carbon fibres, carbon nanotubes, graphene and their mixtures, and is present in said composition in a mass fraction between 1% and 5%.

14. A process for preparing a cathode based on a crosslinked composition which is usable in a cell of a lithium-ion battery comprising an electrolyte based on a lithium salt and on a non-aqueous electrolyte solvent, the process comprising:
   a) melt processing and without solvent evaporation, a polymer crosslinkable composition that is the product of a hot compounding reaction between an active material and additives comprising a polymer binder and an electrically conductive filler, wherein said binder is based on at least one crosslinkable elastomer and wherein said additives furthermore comprise at least one non-volatile organic compound usable in said electrolyte solvent, the composition comprising said active material in a mass fraction greater than or equal to 90%, to obtain a composition in a crosslinkable state; and
   b) crosslinking the crosslinkable composition.

15. The process of claim 14, wherein said at least one non-volatile organic compound is defined by having a boiling point above 150° C. at an atmospheric pressure of $1.013 \times 10^5$ Pa.

16. The process according to claim 14, wherein said process then comprises a step c) of rolling said crosslinked composition so as to deposit it on a metallic current collector with which said cathode is equipped.

17. The process according to claim 14, wherein said active material comprises at least one lithiated polyanionic compound or complex.

18. The process according to claim 17, wherein said at least one lithiated polyanionic compound or complex comprises carbon-coated lithiated iron phosphate of formula $C-LiFePO_4$.

19. The process according to claim 14, wherein said active material comprises at least one lithiated polyanionic compound or complex having an operating voltage below 4 V.

20. The process according to claim 14, wherein said at least one elastomer is a peroxide-crosslinked diene elastomer.

\* \* \* \* \*